(12) United States Patent
Gu et al.

(10) Patent No.: US 9,194,740 B2
(45) Date of Patent: Nov. 24, 2015

(54) IMAGE RETRIEVING APPARATUS AND OPTICAL DISPLACEMENT ESTIMATING APPARATUS

(71) Applicant: PixArt Imaging Inc., Hsin-Chu (TW)

(72) Inventors: Ren-Hau Gu, Hsin-Chu (TW);
Ming-Tsan Kao, Hsin-Chu (TW);
Sen-Huang Huang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 115 days.

(21) Appl. No.: 13/792,168

(22) Filed: Mar. 10, 2013

(65) Prior Publication Data
US 2014/0098377 A1  Apr. 10, 2014

(30) Foreign Application Priority Data

Oct. 4, 2012  (TW) .............................. 101136654 A

(51) Int. Cl.
| | | |
|---|---|---|
| *A61B 5/117* | (2006.01) | |
| *G01N 33/483* | (2006.01) | |
| *G06K 9/00* | (2006.01) | |
| *G06K 9/78* | (2006.01) | |
| *G01J 1/02* | (2006.01) | |
| *G01B 11/14* | (2006.01) | |
| *G01J 1/04* | (2006.01) | |
| *G01J 1/06* | (2006.01) | |
| *G01J 1/08* | (2006.01) | |
| *G01J 1/42* | (2006.01) | |

(52) U.S. Cl.
CPC ............... *G01J 1/0204* (2013.01); *G01B 11/14* (2013.01); *G01J 1/0411* (2013.01); *G01J 1/06* (2013.01); *G01J 1/08* (2013.01); *G01J 1/4228* (2013.01); *G06K 9/00033* (2013.01); *G06K 2009/0006* (2013.01)

(58) Field of Classification Search
CPC ............ G06K 2009/0006; G06K 9/00; G06K 9/00046; G06K 9/00067; G06K 9/00107; G06K 9/0004; G06K 9/00033; G06K 9/0012; G06K 9/00899; G06K 2009/00932; G06K 7/14; G06K 9/001; G06K 9/00744; A61B 2562/0242; A61B 2562/0233; A61B 2562/043; A61B 5/1172; A61B 5/14546; A61B 5/0059; A61B 5/14532; A61B 5/1455; A61B 1/05; A61B 1/0607; A61B 1/0638; A61B 1/0684; A61B 1/0048; A61B 1/0071; A61B 1/0075; A61B 1/0261; A61B 1/14551; G06F 2203/0338; H04L 63/0861; G06Q 20/40145
USPC ..................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 3,543,384 A | * | 12/1970 | Hansen ............................ | 82/47 |
| 4,323,925 A | * | 4/1982 | Abell ........................ | G01J 1/04 |
| | | | | 250/216 |
| 4,932,776 A | * | 6/1990 | Dowling, Jr. ...... | G06K 9/00046 |
| | | | | 356/71 |
| 5,446,290 A | * | 8/1995 | Fujieda et al. ................ | 250/556 |
| 5,708,497 A | * | 1/1998 | Fujieda ................ | G06K 9/0004 |
| | | | | 250/556 |

(Continued)

*Primary Examiner* — Gregory J Toatley
*Assistant Examiner* — Jarreas C Underwood
(74) *Attorney, Agent, or Firm* — Winston Hsu; Scott Margo

(57) ABSTRACT

An image capturing apparatus comprising: a light source, for transmitting incident light to an objective without utilizing any medium besides air, such that the light emits from the objective to generate passing-through light; and a sensor, for capturing an image of the objective according to the passing-through light.

8 Claims, 6 Drawing Sheets

(56) References Cited

U.S. PATENT DOCUMENTS

| | | | | |
|---|---|---|---|---|
| 5,812,252 A * | 9/1998 | Bowker | F41A 17/066 | |
| | | | 250/227.11 | |
| 6,122,042 A * | 9/2000 | Wunderman et al. | 356/73 | |
| 6,229,908 B1 * | 5/2001 | Edmonds et al. | 382/124 | |
| 6,259,108 B1 * | 7/2001 | Antonelli et al. | 250/556 | |
| 6,289,114 B1 * | 9/2001 | Mainguet | 382/124 | |
| 6,353,226 B1 * | 3/2002 | Khalil | A61B 5/14532 | |
| | | | 250/339.11 | |
| 6,703,918 B1 * | 3/2004 | Kita | 340/5.52 | |
| 6,885,439 B2 * | 4/2005 | Fujieda | G06K 9/0004 | |
| | | | 356/71 | |
| 6,927,844 B2 * | 8/2005 | Higuchi et al. | 356/71 | |
| 7,349,562 B2 * | 3/2008 | Ogura | G06K 9/0004 | |
| | | | 250/556 | |
| 7,400,412 B2 * | 7/2008 | Christoph | G01B 11/005 | |
| | | | 356/601 | |
| 7,577,279 B2 * | 8/2009 | Sano et al. | 382/124 | |
| 8,189,051 B2 * | 5/2012 | Shih et al. | 348/169 | |
| 8,768,015 B2 * | 7/2014 | Higuchi | A61B 5/1172 | |
| | | | 382/125 | |
| 2002/0190960 A1 * | 12/2002 | Kuo | G06F 3/03547 | |
| | | | 345/173 | |
| 2003/0215117 A1 * | 11/2003 | Hata | G06K 9/0004 | |
| | | | 382/124 | |
| 2006/0187200 A1 * | 8/2006 | Martin | 345/156 | |
| 2009/0074263 A1 * | 3/2009 | Higuchi | 382/126 | |
| 2009/0304237 A1 * | 12/2009 | Yoshikawa | A61B 5/1172 | |
| | | | 382/116 | |

\* cited by examiner

IMAGE RETRIEVING APPARATUS AND OPTICAL DISPLACEMENT ESTIMATING APPARATUS

BACKGROUND OF THE INVENTION

1. Field of the Invention

The present invention relates to an image capturing apparatus and an optical displacement estimating apparatus, and particularly relates to an image capturing apparatus and an optical displacement estimating apparatus, which directly emits the light from a light source to a objective without utilizing any medium besides air.

2. Description of the Prior Art

Following the improvement of technique, the touch control apparatus utilizing a machine type touch control device, a capacitor type touch control device or a resistor type touch control device is gradually replaced with an optical touch control apparatus. Such kind of optical touch control apparatus can be regarded as an optical displacement estimating apparatus, since it detects a relative displacement between a objective (ex. a finger) and a detecting surface of the optical displacement estimating apparatus.

Such kind of optical displacement estimating apparatus always includes an image capturing apparatus to capture frames of images generated by the objective in different timings, and accordingly generates the displacement estimating for the objective. FIG. 1(a) is a cross-section view of an optical displacement estimating apparatus 100, which can be regarded as an image capturing apparatus of the optical displacement estimating apparatus 100. FIG. 1(b) is a block diagram illustrating a circuit, which is inside the optical displacement estimating apparatus 100, for controlling the displacement estimating operation. In FIG. 1(a), the optical displacement estimating apparatus 100 includes a reflection device 101, a light source 103, a lens 105, a sensor 107 and a detecting surface 109. The light from the light source 103 is reflected by the reflection device 101 and then emits to the finger F on the detecting surface 109 to generate an image. The sensor 107 captures frames of the image, which belong to different timings, via the lens 105. The processing unit 113 computes the displacement of the finger F according to frames belonging to different timings. Additionally, the processing unit 113 also controls data accessing of the storage apparatus 115 and operations of the light source control unit 117.

However, since some optical devices such as the reflecting device 101 and the lens 105 are necessary for the structure in FIG. 1(a), the total volume is large. Additionally, in such structure the transmitting path for the optical signal is longer and the optical signal must suffer the reflecting operation and the passing operation, thus the imaging and the contrast of finger print is unapparent. Additionally, the image of the finger is easily affected by ambient light in such structure.

SUMMARY OF THE INVENTION

Therefore, one purpose of the present invention is to provide an image capturing apparatus having a smaller size and the optical displacement estimating apparatus utilizing the image capturing apparatus.

Therefore, one purpose of the present invention is to provide an image capturing apparatus that can decrease the interference of ambient light and the optical displacement estimating apparatus utilizing the image capturing apparatus.

Therefore, one purpose of the present invention is to provide an image capturing apparatus that can enhance clarity of the objective image and the optical displacement estimating apparatus utilizing the image capturing apparatus.

One embodiment of the present invention discloses an image capturing apparatus, comprising: a light source, for transmitting incident light to an objective without utilizing any medium besides air, such that the light emits from the objective to generate passing-through light; and a sensor, for capturing an image of the objective according to the passing-through light.

Another embodiment of the present invention discloses an optical displacement estimating apparatus, comprising: a light source, for transmitting incident light to a objective without utilizing any medium besides air, such that the light emits from the objective to generate passing-through light; and a sensor, for capturing an image of the objective according to the passing-through light; and a processor, for performing displacement estimating to the objective according to images at different timings.

In view of above-mentioned embodiments, the structure can be thinner, the cost can be decreased and manufacturing for the apparatus is easier since the light source directly emits the incident light to the objective. Furthermore, the optical signal is stronger since the light is directly emitted to the objective and then enters the sensor, such that the finger print is more apparent and the interference that ambient light causes to the finger image can be decreased. Furthermore, the side direction light can be blocked since the light gate and the thin film are provided, such that the interference caused by ambient light can be decreased.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 2:
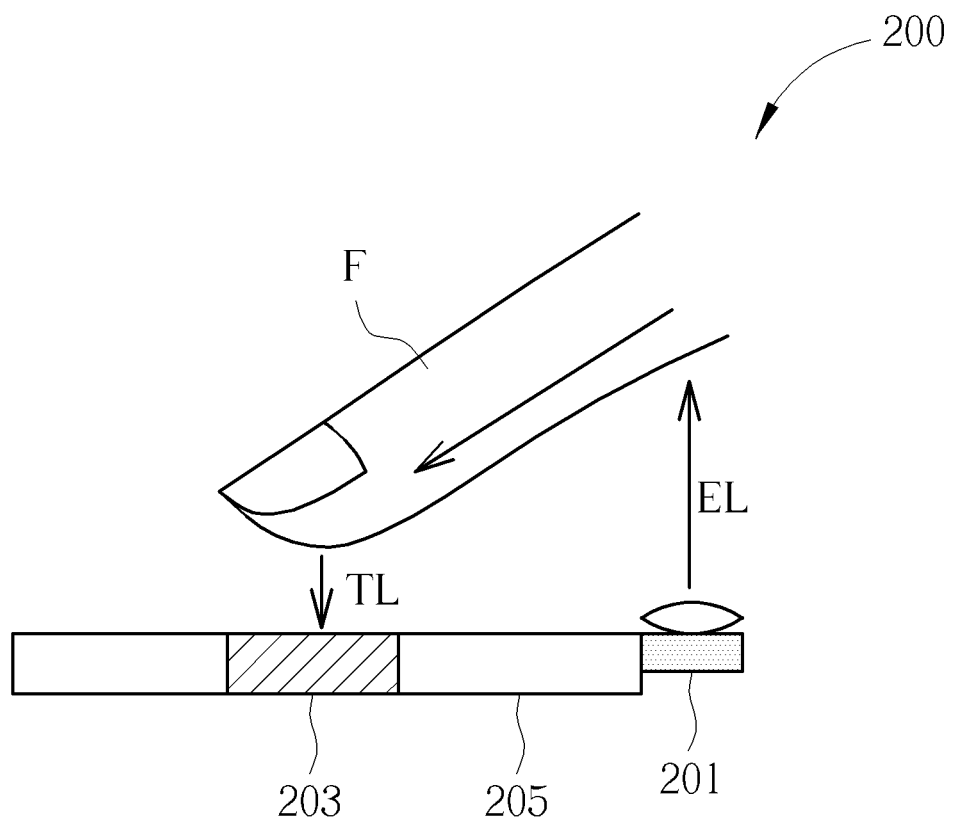
FIG. 2 to FIG. 5 are schematic diagrams illustrating image capturing apparatuses according to different embodiments of the present invention.

FIG. 2 to FIG. 5 are schematic diagrams illustrating image capturing apparatuses according to different embodiments of the present invention. As shown in FIG. 2, the image capturing apparatus 200 comprises a light source 201 and a sensor 203. The sensor 203 can be surrounded and protected by protecting material 205 such as epoxy, but is not limited. The light source 201 transmits the incident light EL to an objective, which is a finger F in this embodiment but can be other objects, without utilizing any medium besides air, such that the light passes through the finger F to generate passing-through light TL. The sensor 203 captures an image of the finger F according to the passing-through light TL. In this embodiment, a material layer can be provided to a surface of the sensor 203 to protect the sensor 203 from being damaged due to the direct touch of the finger F The material does not affect the light emitting.

Other devices can be provided to the structure shown in FIG. 2, such that the imaging quality can be better. For example, in the embodiment shown in FIG. 3, the image capturing apparatus 300 can further comprise a light isolating device 303 besides the light source 301 and the sensor 305. The sensor 305 receives the passing-through light TL after the passing-through light TL passes through the light isolating device 303. Additionally, the image capturing apparatus 300 can further comprise a cover 307 which can be glass or plastic, to protect the sensor 305. The light isolating device 303 isolates light from least one direction excluding a transmitting direction of the passing-through light TL, such that the sensor 305 can avoid the influence of ambient light. For example, the light isolating device 303 can be a light gate, which can block side direction light SL. That is, the light isolating device 303 makes the passing-through light TL can only be emitted to the sensor 305 in a direction perpendicular to a receiving surface 306 of the sensor 305. The bore diameters of the light gate can be changed corresponding to a size of the sensor or different design requirement, but it is larger or equal than a pixel in one embodiment.

Figure 4:
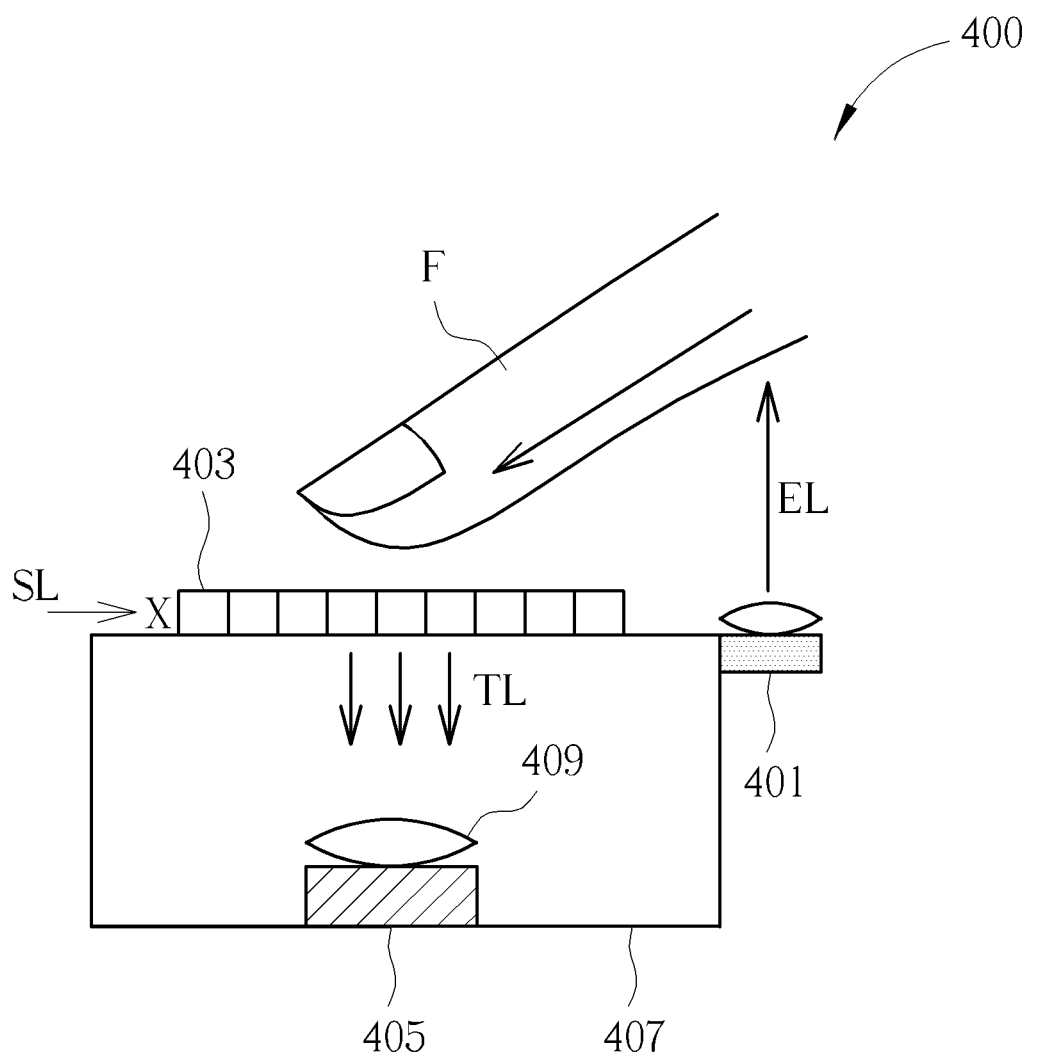

FIG. 4 is a schematic diagrams illustrating image capturing apparatuses 400 according to another embodiment of the present invention. The structure of the image capturing apparatuses 400 is similar with which of the image capturing apparatuses 300. The image capturing apparatuses 400 also includes a light source 401, a light isolating device 403, a sensor 405 and a cover 407, and further includes a lens 409. The lens 409 can provide suitable refraction or transmission before the passing-through light TL is transmitted to the sensor 405, such that the image quality can be better.

Figure 3:
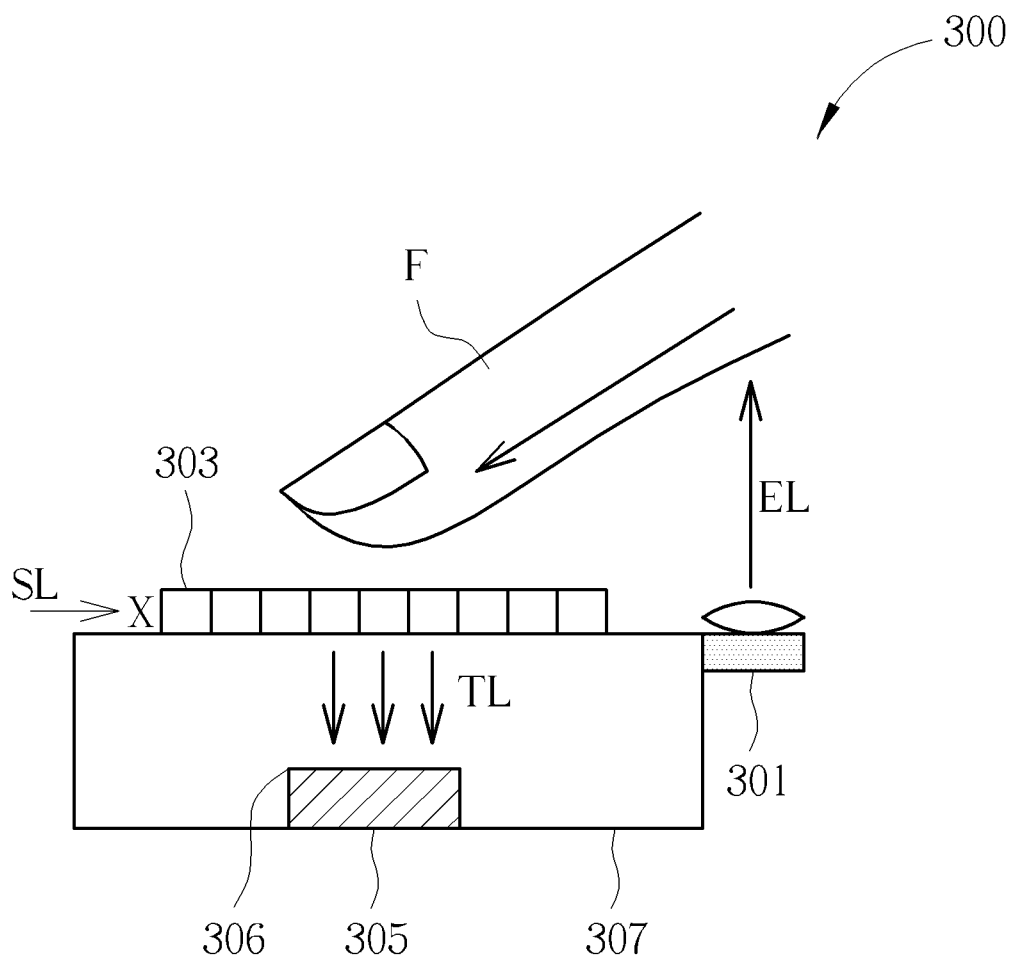
Figure 5:
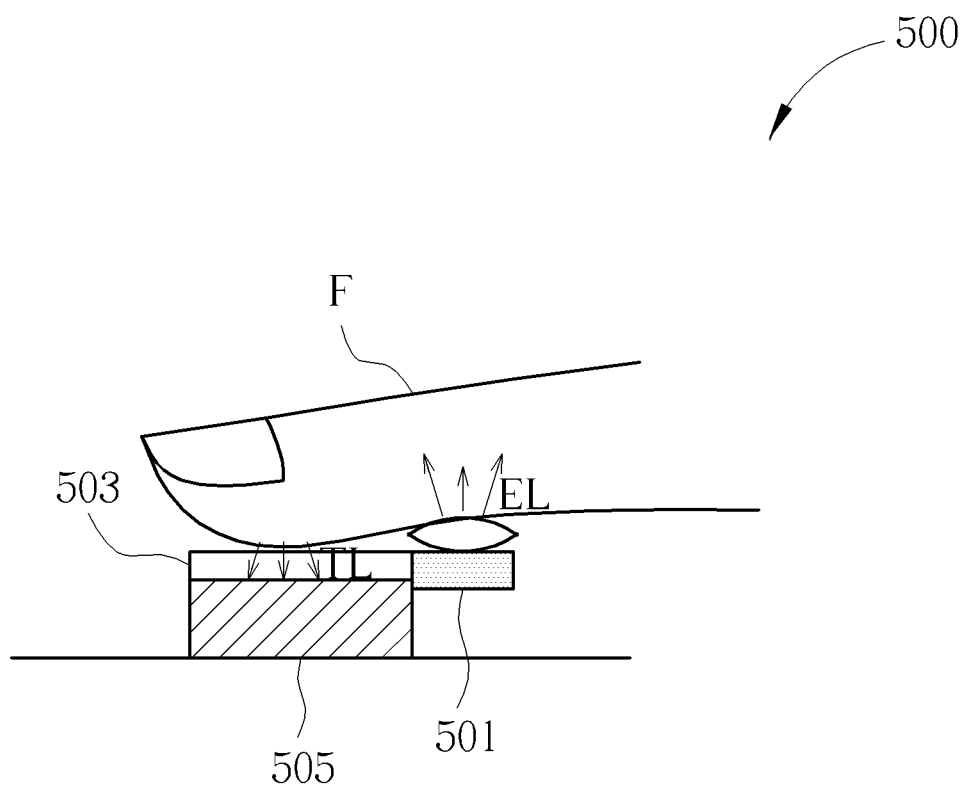

The light isolating device shown in FIGS. 3 and 4 can be replaced with a thin film. The embodiment shown in FIG. 5 discloses such structure. As shown in FIG. 5, the image capturing apparatus 500 includes a light source 501, a thin film 503 and a sensor 505. The light source 501 directly emits the incident light EL to the finger F, to generate passing-through light TL, which passes through the thin film 503 and then being received by the sensor 505. The thin film 503 can comprise epoxy, glass, glass fiber or optic fiber. The material constructing the thin film 503 depends on desired refraction level or light isolation level. Also, if the structure including the thin film shown in FIG. 5 is utilized, the coordination for the refraction indexes of the thin film material and the finger skin must be taken into account. For example, the refraction index for epoxy is 1.4-1.5, the refraction index for glass is 1.2-1.8, and the refraction index of glass fiber is 1.5. Additionally, the refraction index of the finger skin is about 1.4-1.5, since it contains water, fat, and protein. Therefore, the fraction index combination for different materials must be taken into account such that the light can be refracted as desired. Furthermore, other parameters besides the refraction index, such as an incident angle, a reflection light, a thin film thickness or a sensor cover thickness must be taken into account as well. Since the rules for computing these parameters are different for different materials and design requirements and are well known by persons skilled in the art, they are omitted for brevity here. Additionally, in the embodiments shown in FIG. 2 to FIG. 5, a transmitting direction of the incident light is opposite to a transmitting direction of the passing-through light due to the location of the light source. However, it does not mean to limit the location of the light source.

Figure 6:
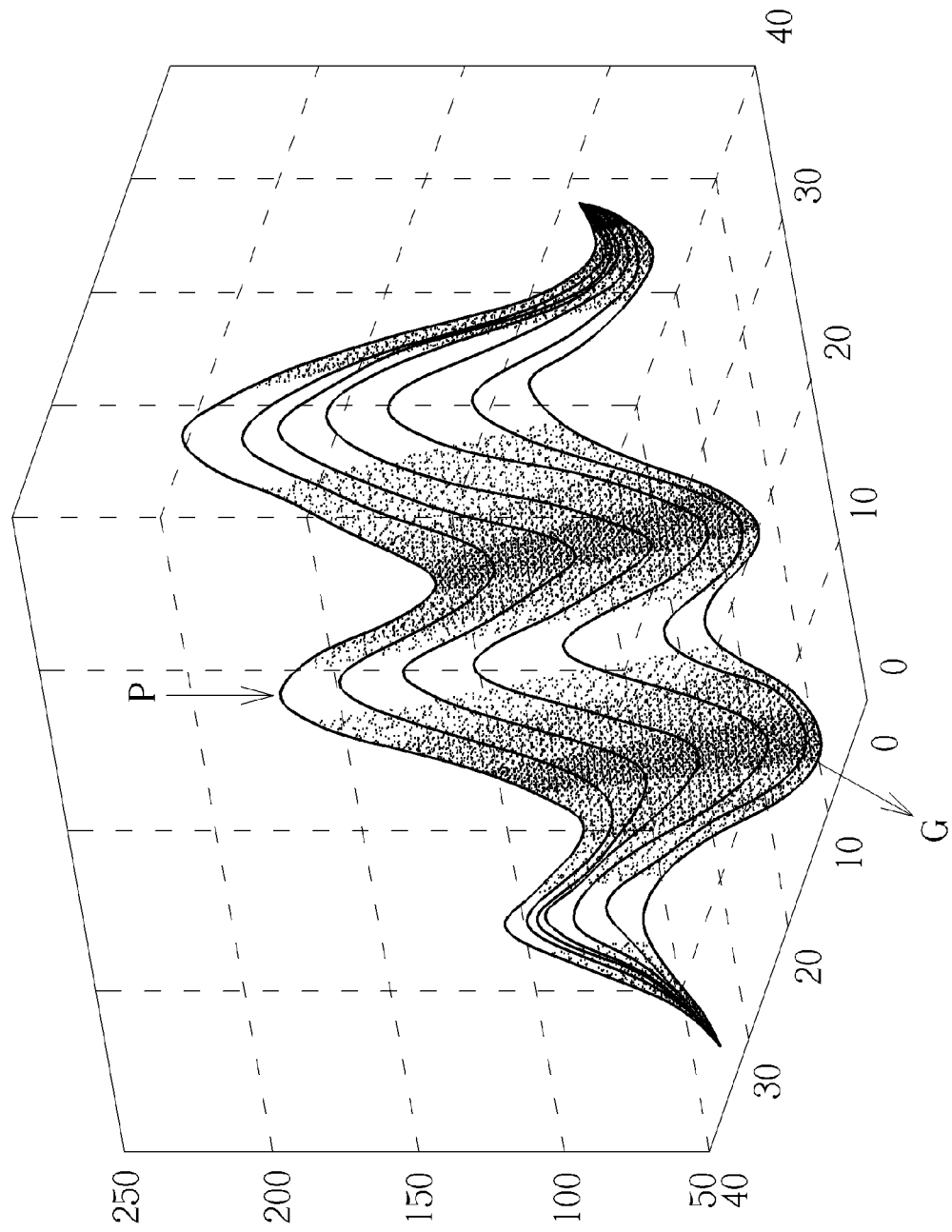
FIG. 6 is a schematic diagram illustrating function of the image capturing apparatus according to one embodiment of the present invention.

In view of above-mentioned embodiments, the structure can be thinner, the cost can be decreased and manufacturing for the apparatus is easier since the light source directly emits the incident light to the objective. Furthermore, the optical signal is stronger since the light is directly emitted to the objective and then enters the sensor, such that the finger print is more apparent and the interference that ambient light causes to the finger image can be decreased. Furthermore, the side direction light can be blocked since the light gate and the thin film are provided, such that the interference caused by ambient light can be decreased. FIG. 6 is a schematic diagram illustrating function of the image capturing apparatus according to one embodiment of the present invention. The horizontal axis of FIG. 6 indicates light intensity and the vertical axis indicates different regions. The wave crest P indicates the finger print protruding part and the wave through G indicates a concave part of the finger print. According to FIG. 6, the wave crest P has obvious difference from the wave through G, which means the protruding part and the concave part have significant contrast. The light intensity of the protruding part and the concave part can be computed via performing integration steps corresponding to different device heights and the light intensity to different parts for the protruding part and the concave part. There are various types of methods for such skill and are well known by persons skilled in the art, thus is omitted for brevity here.

Figure 1:
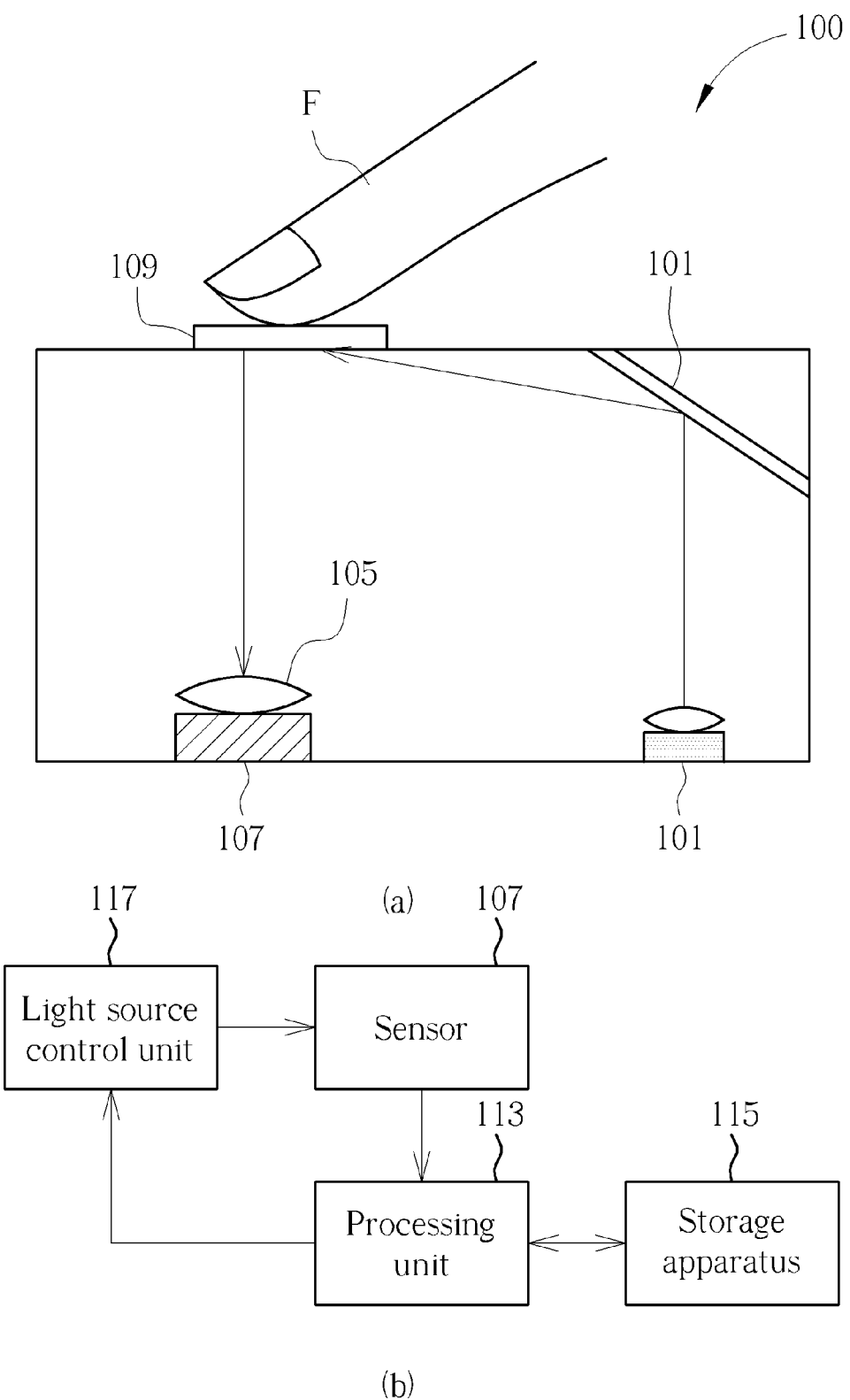
FIG. 1 is a schematic diagram illustrating an image capturing apparatus of a prior art optical displacement estimating apparatus.

The above-mentioned image capturing apparatus can be applied to the circuit structure shown in FIG. 1(b). In this case, the image captured by the sensor 107 is transmitted to the processing unit 113, then the processing unit 113 performs displacement estimation according to images at different timings. However, it does not mean to limit the image capturing apparatus according to the present invention can only be applied to the circuit structure shown in FIG. 1(b).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical displacement estimating apparatus, comprising:
   a light source, for transmitting incident light to a finger without utilizing any medium besides air, such that the light emits from the finger to generate passing-through light; and
   a sensor, for capturing a finger print image of the finger according to the passing-through light, wherein the finger print image comprises at least one finger print protruding part image and at least one finger print concave part image;
   a processing circuit, configured to perform displacement estimating to the finger according to images at different timings;
   a light isolating device, located between the sensor and the finger, for isolating light from least one direction, wherein the sensor still can receive the passing-through light via the light isolating device;
   a cover, wherein part of the cover is below the sensor and the light isolating device is above the sensor and all the cover.

2. The optical displacement estimating apparatus of claim 1, wherein the sensor directly receives the passing-through light.

3. The optical displacement estimating apparatus of claim 1, wherein the light isolating device is a light gate.

4. The optical displacement estimating apparatus of claim 1, further comprising:
   a lens, located between the light isolating device and the sensor.

5. The optical displacement estimating apparatus of claim 1, wherein the light isolating device makes the passing-through light can only be emitted to the sensor in a direction perpendicular to a receiving surface of the sensor.

6. The optical displacement estimating apparatus of claim 1, further comprising a thin film located between the sensor and the finger, for refracting the passing-through light to the sensor.

7. The optical displacement estimating apparatus of claim 6, wherein the thin film is an epoxy thin film, a glass thin film, a glass fiber thin film or an optic fiber thin film.

8. The optical displacement estimating apparatus of claim 1, wherein a transmitting direction of the incident light is opposite to which of the passing-through light.

* * * * *